US009821389B2

(12) United States Patent
Buser

(10) Patent No.: US 9,821,389 B2
(45) Date of Patent: Nov. 21, 2017

(54) DUST CAPTURING DEVICE FOR RECIPROCATING SAWS

(71) Applicant: John Buser, San Diego, CA (US)

(72) Inventor: John Buser, San Diego, CA (US)

(73) Assignee: SHAVE AWAY EUROPE, INC., San Diego, CA (US)

( * ) Notice: Subject to any disclaimer, the term of this patent is extended or adjusted under 35 U.S.C. 154(b) by 415 days.

(21) Appl. No.: 14/012,696

(22) Filed: Aug. 28, 2013

(65) Prior Publication Data
US 2015/0059542 A1    Mar. 5, 2015

(51) Int. Cl.
*B26D 7/18* (2006.01)
*B23Q 11/02* (2006.01)
*B23D 59/00* (2006.01)
*A47L 1/00* (2006.01)
*A47L 7/00* (2006.01)
*A47L 9/24* (2006.01)
*B23D 49/16* (2006.01)

(52) U.S. Cl.
CPC ............. *B23D 59/006* (2013.01); *A47L 1/00* (2013.01); *A47L 7/0095* (2013.01); *A47L 9/242* (2013.01); *B23D 49/16* (2013.01); *Y10T 83/0453* (2015.04); *Y10T 83/207* (2015.04)

(58) Field of Classification Search
CPC ......... B27B 11/00; B27B 19/02; B27B 19/00; B27B 19/09; B26B 7/00; B26B 7/005; B26D 7/18; B26D 7/1863; B23Q 11/0046; B23Q 11/0042; B23Q 11/0057; B23Q 11/0067; B23Q 11/0071; Y10T 83/0453; Y10T 83/207

USPC ..................................................... 30/392–394
See application file for complete search history.

(56) References Cited

U.S. PATENT DOCUMENTS

| | | | | |
|---|---|---|---|---|
| 3,882,598 A | * | 5/1975 | Earle ................... | B23D 59/006 144/252.1 |
| 5,115,542 A | * | 5/1992 | Gehres ................. | F16L 3/2235 24/339 |
| 5,199,174 A | * | 4/1993 | Wild .................... | B23D 59/006 30/123.3 |
| 5,540,616 A | * | 7/1996 | Thayer ................. | B24D 15/023 451/354 |
| 5,689,884 A | * | 11/1997 | Wershe ................ | B23D 47/005 30/123.3 |
| 6,004,197 A | * | 12/1999 | Huber ................... | B24B 23/03 451/357 |
| 6,772,664 B2 | * | 8/2004 | Chiang .................. | B08B 15/04 144/252.1 |

(Continued)

*Primary Examiner* — Phong Nguyen
(74) *Attorney, Agent, or Firm* — Steins & Associates, P.C.

(57) ABSTRACT

A Dust Capturing Device for Reciprocating Saws is disclosed. The device is attachable to a convenational shop vacuum cleaner so that virtually all dust created by the reciprocating saw at the cutting blade is captured by the vacuum cleaner. The system is universally attachable to all powered reciprocating saws on the market. A pair of suction hoses are snugly attached to the body of the saw, from intake ports located adjacent to the saw blade to an adapter manifold that combines the two suction hoses into a single hose adaptable to the vacuum cleaner hose. The hoses are attached to the body of the saw by one or more body straps, with each body strap having a pair of hose clips extending therefrom for restraining the two suction hoses running along the body.

9 Claims, 5 Drawing Sheets

(56) References Cited

U.S. PATENT DOCUMENTS

| | | | | |
|---|---|---|---|---|
| 6,833,016 B2* | 12/2004 | Witter | ............... | B01D 50/002 |
| | | | | 451/88 |
| 8,793,835 B2* | 8/2014 | King, Jr. | ............. | B23D 59/006 |
| | | | | 15/339 |
| 2003/0047053 A1* | 3/2003 | Nakamura | ............ | B23D 51/18 |
| | | | | 83/651 |
| 2004/0112191 A1* | 6/2004 | Whiffen | ............ | B23Q 11/0046 |
| | | | | 83/24 |
| 2006/0053629 A1* | 3/2006 | Martin | ............... | B23D 59/006 |
| | | | | 30/123 |
| 2007/0289075 A1* | 12/2007 | Gopalan | ............. | E04H 4/1654 |
| | | | | 15/1.7 |
| 2009/0178593 A1* | 7/2009 | Yu | ..................... | B23D 59/006 |
| | | | | 108/28 |
| 2012/0325360 A1* | 12/2012 | McGrath | ............... | F16L 11/02 |
| | | | | 138/109 |

* cited by examiner

DUST CAPTURING DEVICE FOR RECIPROCATING SAWS

BACKGROUND OF THE INVENTION

1. Field of the Invention

This invention relates generally to handheld power tools and, more specifically, to a Dust Capturing Device for Reciprocating Saws.

2. Description of Related Art

Handheld power reciprocating saws, such as the "Sawzall®" device, are the tool of choice for a variety of construction tasks.[1] One particular task that they are well-suited for is that of demolition.

[1] Sawzall® is a registered trademark of Milwaukee Electric Tool Corporation

Demolition work is often done on aging structures. Many times older building structures consist of obsolete and sometimes harmful building materials, such as asbestos and lead paint. The problem with demolishing structures having these harmful materials is that, absent special precautions, the demolition process will generate harmful airborne dust. Once airborne, the harmful dusts are a significant health hazard for workers, unless some type of abatement measure is taken.

A product marketed as the "Sawbuddie™" is touted as being capable of capturing 99% of airborne dust.[2] The Sawbuddie™ is a brush head that fits over the reciprocating saw, and then connects to a conventional vacuum cleaner (by hose). While the Sawbuddie™ is an improvement in dust remediation, it suffers from at least three drawbacks: (1) the brush covers the saw blade (and cutting area), and obscures the operator's view of the cutting area; (2) the brush housing causes there to be a separation area surrounding the blade—this makes low-clearance cuts difficult or impossible; and (3) the bell-shaped brush housing defines a larger intake opening for the dust suction—this additional diameter at the point of injection requires a high level of vacuum flow. This additional flow requirement mandates a large vacuum cleaner, which adds to the overall cost and the bulkiness of the system.

[2] http://www.dustlessdepot.com/7_SawBuddie_0153_p/d2415.htm

What is needed is a low-profile dust collection system for reciprocating saws that provides high dust collection efficiency without interfering with the operator's vision or the tool's cutting clearance.

SUMMARY OF THE INVENTION

In light of the aforementioned problems associated with the prior devices and systems, it is an object of the present invention to provide a Dust Capturing Device for Reciprocating Saws. The device should be attachable to a conventional shop vacuum cleaner so that virtually all dust created by the reciprocating saw at the cutting blade is captured by the vacuum cleaner. The system should be universally attachable to all powered reciprocating saws on the market. A pair of suction hoses should be snugly attached to the body of the saw, from intake ports located adjacent to the saw blade to an adapter manifold that combines the two suction hoses into a single hose adaptable to the vacuum cleaner hose. The hoses should be attached to the body of the saw by one or more body straps, with each body strap having a pair of hose clips extending therefrom for restraining the two suction hoses running along the body.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Dust Capturing Device for Reciprocating Saws.

Figure 1:
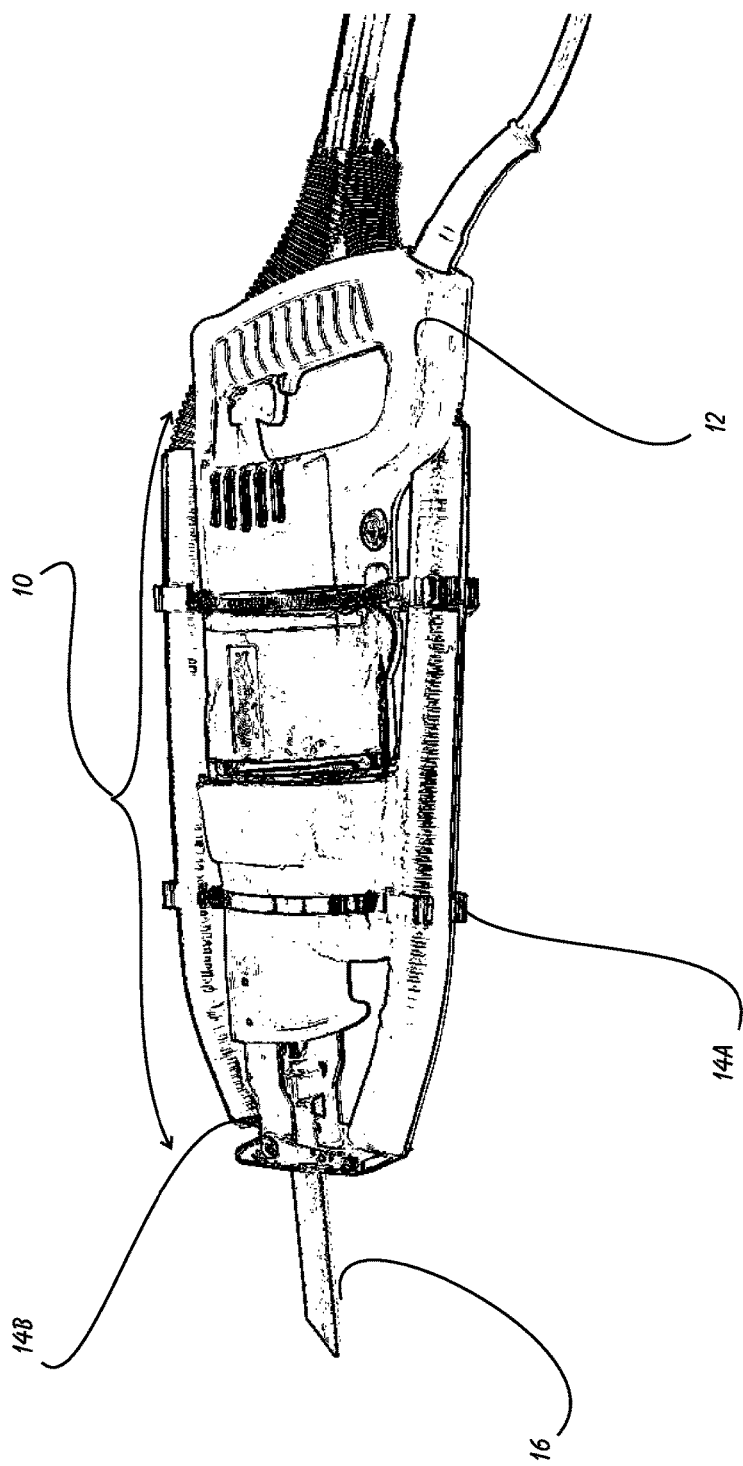
FIG. 1 is a side view of a preferred embodiment of the dust-capturing device of the present invention installed on a reciprocating saw.

The present invention can best be understood by initial consideration of FIG. 1.[3] FIG. 1 is a side view of a preferred embodiment of the dust-capturing device 10 of the present invention installed on a reciprocating saw 12. The device 10 is designed to be attached to a conventional 1½ inch vacuum cleaner hose, such as is the norm provided with a two horsepower HEPA-filtered shop vacuum cleaner. Unlike the prior Sawbuddie™ device, the device of the present invention does not cover or otherwise obscure the reciprocating saw blade 16. This design comprises a pair of suction hoses 14A, 14B running the length of the saw 12 and terminating on either side of the blade 16, as is described in additional detail below in connection with FIG. 2.

[3] As used throughout this disclosure, element numbers enclosed in square brackets [ ] indicates that the referenced element is not shown in the instant drawing figure, but rather is displayed elsewhere in another drawing figure.

Figure 2:
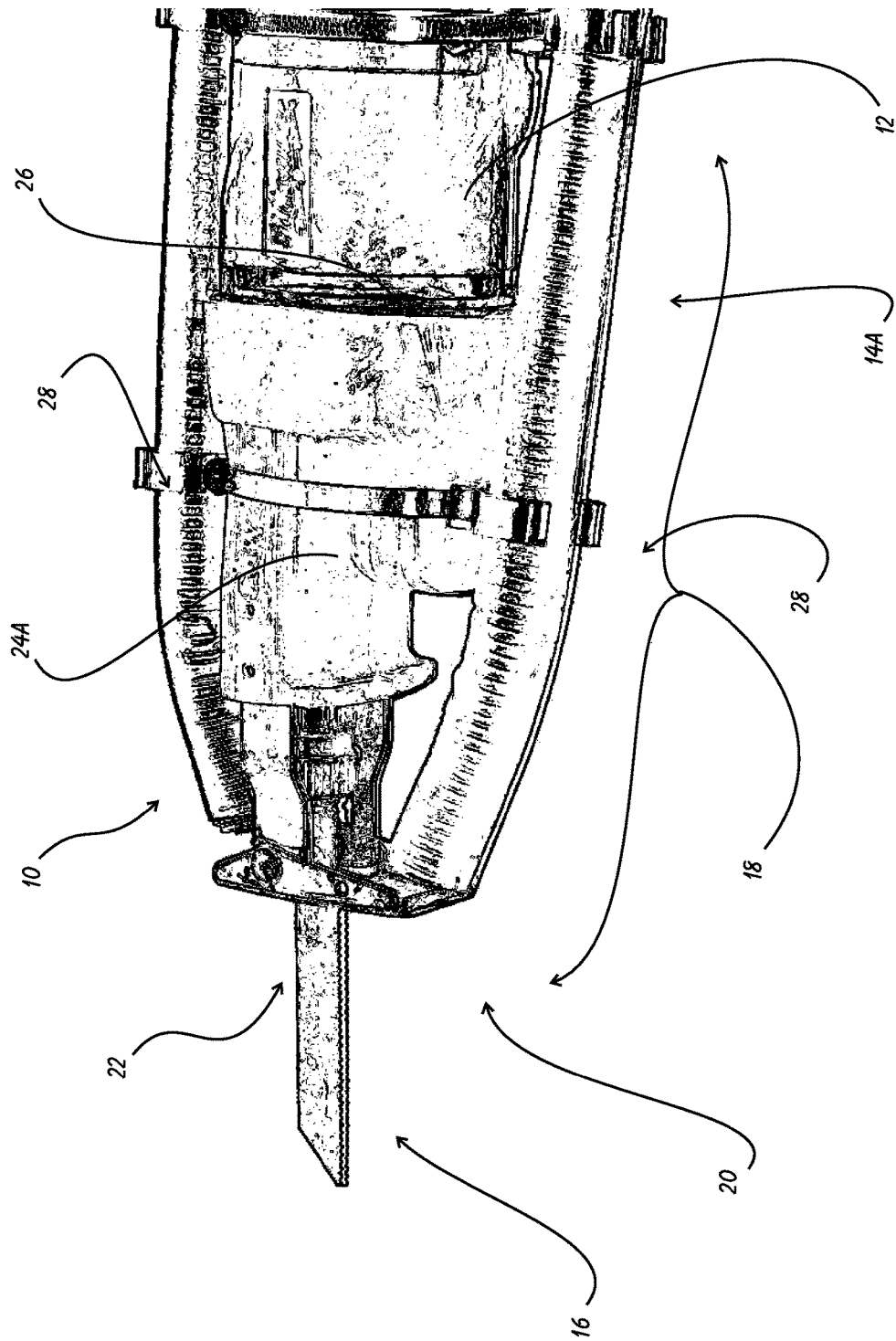
FIG. 2 is a partial side view of the tip portion of the device and saw of FIG. 1.

FIG. 2 is a partial side view of the tip portion of the device 10 and saw 12 of FIG. 1. The suction hoses 14A, 14B run the length of the saw body 26, and are attached thereto by a pair of hose clips 28. The hose clips 28 extend from a pair of body straps (the lower body strap 24A shown here). In order to accommodate virtually any manufacturer's reciprocating saw 12, the straps 24A, [24B] can be placed at user-selected locations along the saw body 26, such they do not interfere with the functionality of the saw 12, or with the user's ability to grasp the tool.

Each suction hose 14A, [14B] is defined by a memory portion 18 that terminates in an intake port 20. The hoses 14A, [14B] are positioned by the user along the saw body 26 so that the intake ports 20 are immediately adjacent to the blade shoe 22. This insures that the hoses 14A, [14A] and intake ports 20 are clear of the moving saw blade 16, and do not obscure the user's vision or the clearance between the saw blade 16 and the surrounding area.

The memory portions 18 of the hoses 14A, [14B] are designed to be bendable to a desired shape/location, and then to hold that position (i.e. this is the "memory"). It has been determined that a desirable method for manufacturing these memory portions 18 is to shrink-wrap one or more pieces of aluminum rod to the outside of a piece of conventional ribbed tubing. That way, the tubing remains bendable, and the rod(s) will hold the bent configuration when the tubing 18 is released. Other versions may also be employed, such as wherein the memory filaments are manufactured or molded into the tubing when fabricated. If we now turn to FIG. 3, we can examine the other features of this new device.

Figure 3:
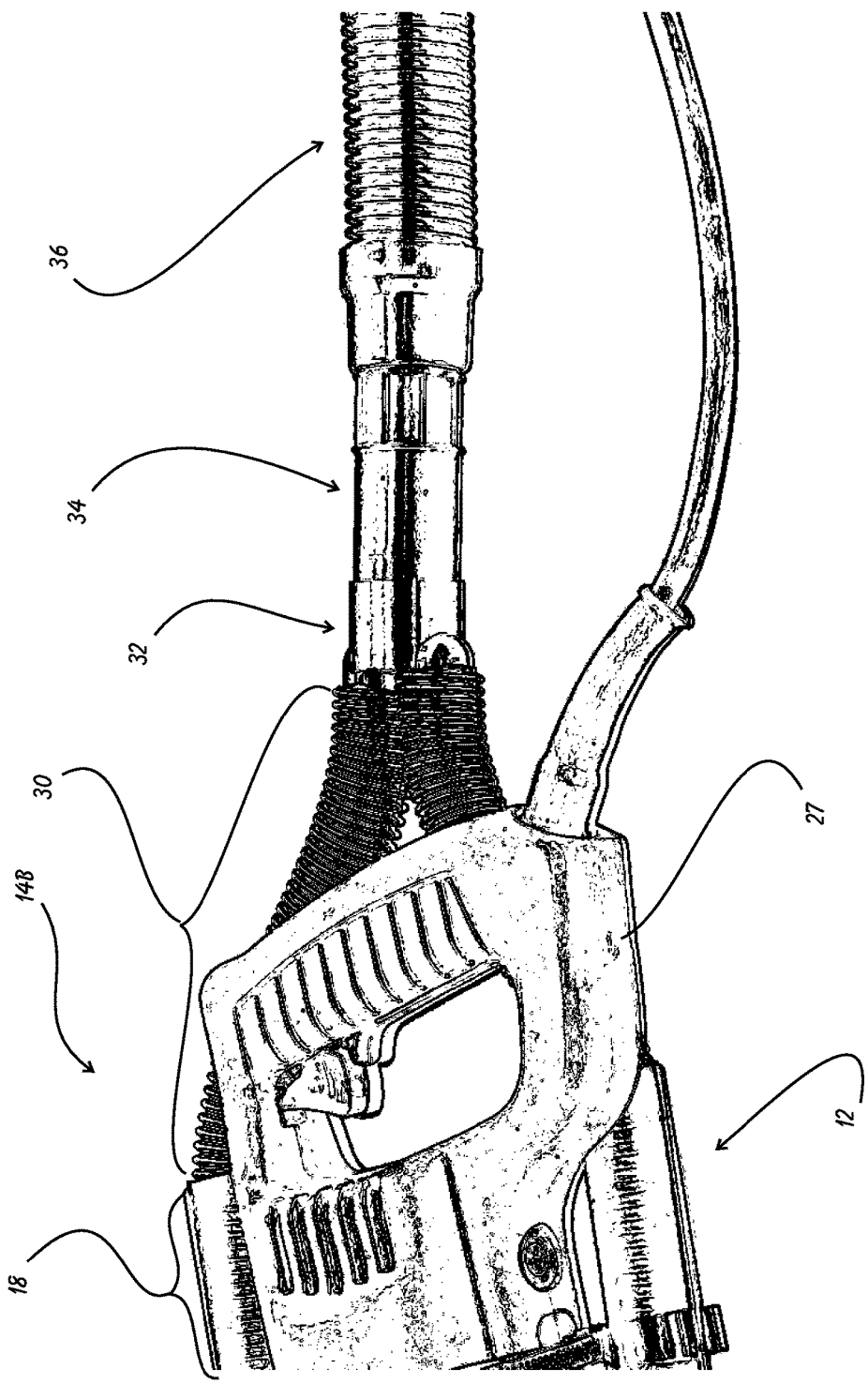
FIG. 3 is a partial side view of the handle portion of the device and saw of FIGS. 1 and 2.

FIG. 3 is a partial side view of the handle portion 27 of the device [10] and saw 12 of FIGS. 1 and 2. The distal ends (i.e. the ends furthest from the saw blade [16]) of the hoses [14A], 14B come together and terminate in a connection to an adapter manifold 32. These most-distal portions of the hoses [14A], 14B are adjacent to the memory portions 18, but do not have the memory feature. These are termed "non-memory" portions 30 of the hoses [14A], 14B, and essentially are unmodified portions of the internal flexible tubing making up the hoses [14A], 14B. It is desirable that there be no additional stiffness (from the aluminum rods) in the non-memory portions 30, so as to give the user the maximum flexibility in the handling of the saw 12.

Figure 4:
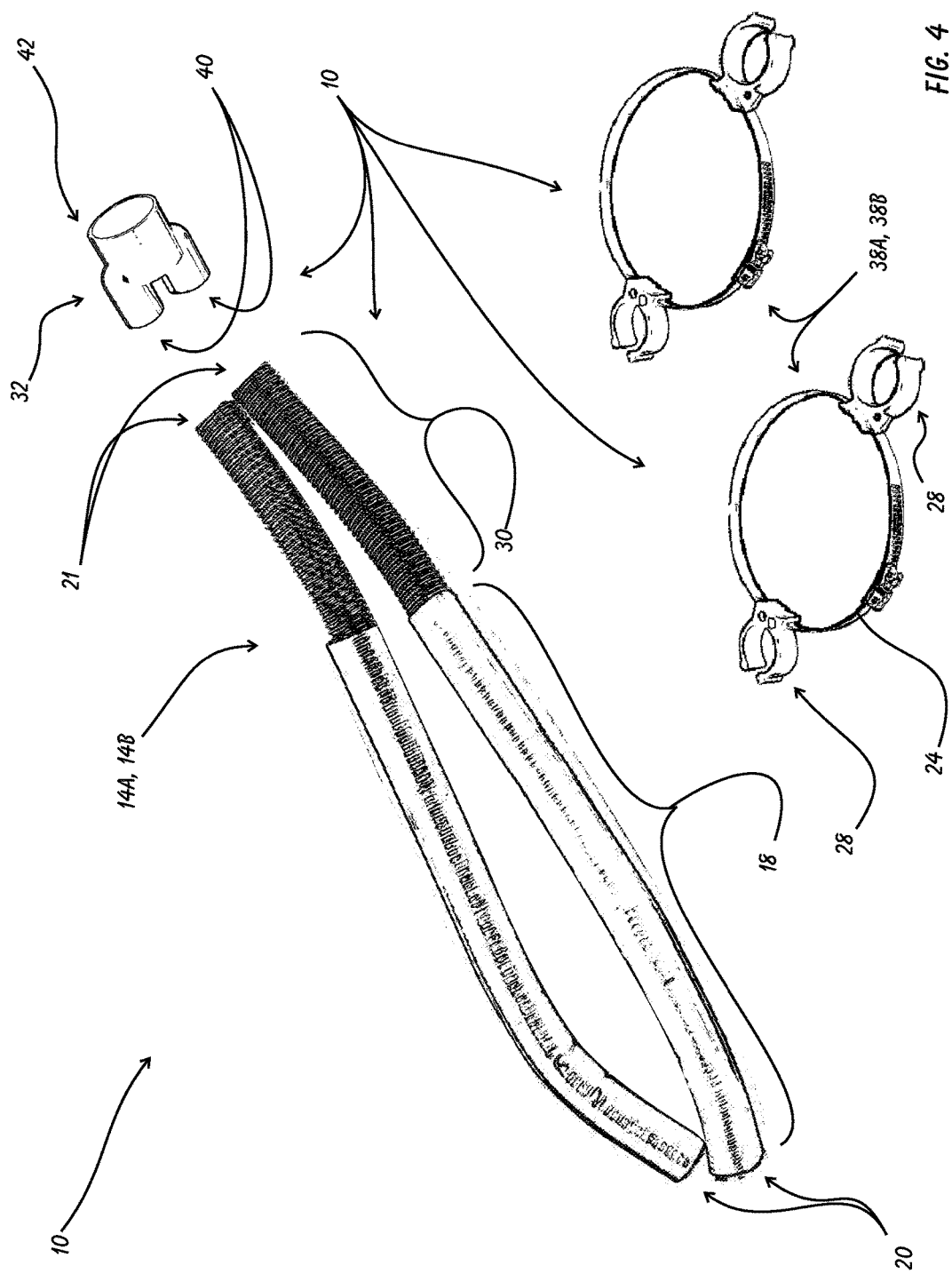
FIG. 4 is an exploded view of the dust-capturing device of FIGS. 1-3.

The adapter manifold 32 converts the two suction inlets from the hoses [14A], 14B into a single hose end 34. In the depicted version, the manifold 32 converts two ¾ inch tubes (hoses [14A] and 14B) to a single 1¼ inch diameter outlet tube. An adapter may then be used to increase the diameter to 1½ inch in diameter, which is the size for a conventional vacuum cleaner hose. While a variety of different diameters are possible (and may be changed by various adapters), typically this will be a one-and-one-half inch diameter tube, as this is a conventional size for small shop vacuum cleaners. The vacuum hose 36 then extends from the hose end 34 to the vacuum cleaner (not shown). FIG. 4 is provided to summarize all of the elements of the "kit" that is the assembly of the present invention 10.

FIG. 4 is an exploded view of the dust-capturing device 10 of FIGS. 1-3. The suction hoses 14A, 14B are defined by memory portions 18 terminating (at their proximal ends) in intake ports 20. Adjacent to the memory portions 18 are the non-memory portions 30, which terminate (at their distal ends) in exit ports 21. The distal ends of the hoses 14A, 14B are inserted or otherwise attached to a pair of intake suction nozzles 40 formed in the adapter manifold 32. These two suction nozzles 40 merge to form an exit nozzle 42 at the opposite end of the adapter manifold 32. As discussed previously, the hose end [34] (or adapter) interconnects the exit nozzle 42 with the vacuum cleaner's hose [36].

One or more clip assemblies 38A, 38B are provided with the device 10. Each assembly 38A, 38B is defined by a body strap 24 that is designed to fit around the body [26] of the reciprocating saw [12]. In this version, the body straps 24 are made from conventional pipe clamps that can be tightened snugly to the body [26] after they are placed in position. While only a lower body strap [24A] is necessary, it is preferred that an additional body strap 24 be attached to the saw [12] in spaced relation to the lower body strap [24A], and closer to the handle portion [27].

As discussed previously, the Sawbuddie™ has a brush head that fits over the blade. While these brush bristles are two to three inches long, the brush head is limited in its adjustability. If the shoe [22] is extended out (it can be moved down up to six inches), such as to accommodate a 12-inch blade, the brush head won't even enclose the cutting area, and no dust collection will result.

Each body strap 24 has a pair of hose clips 28 slidingly attached to them. The clips 28 slide along the straps 24 so that their position can be adjusted as the body straps 24 are cinched down snugly to the body [26]. The preferred installation locations for the clip assemblies 38A, 38B are shown in FIG. 5.

Figure 5:
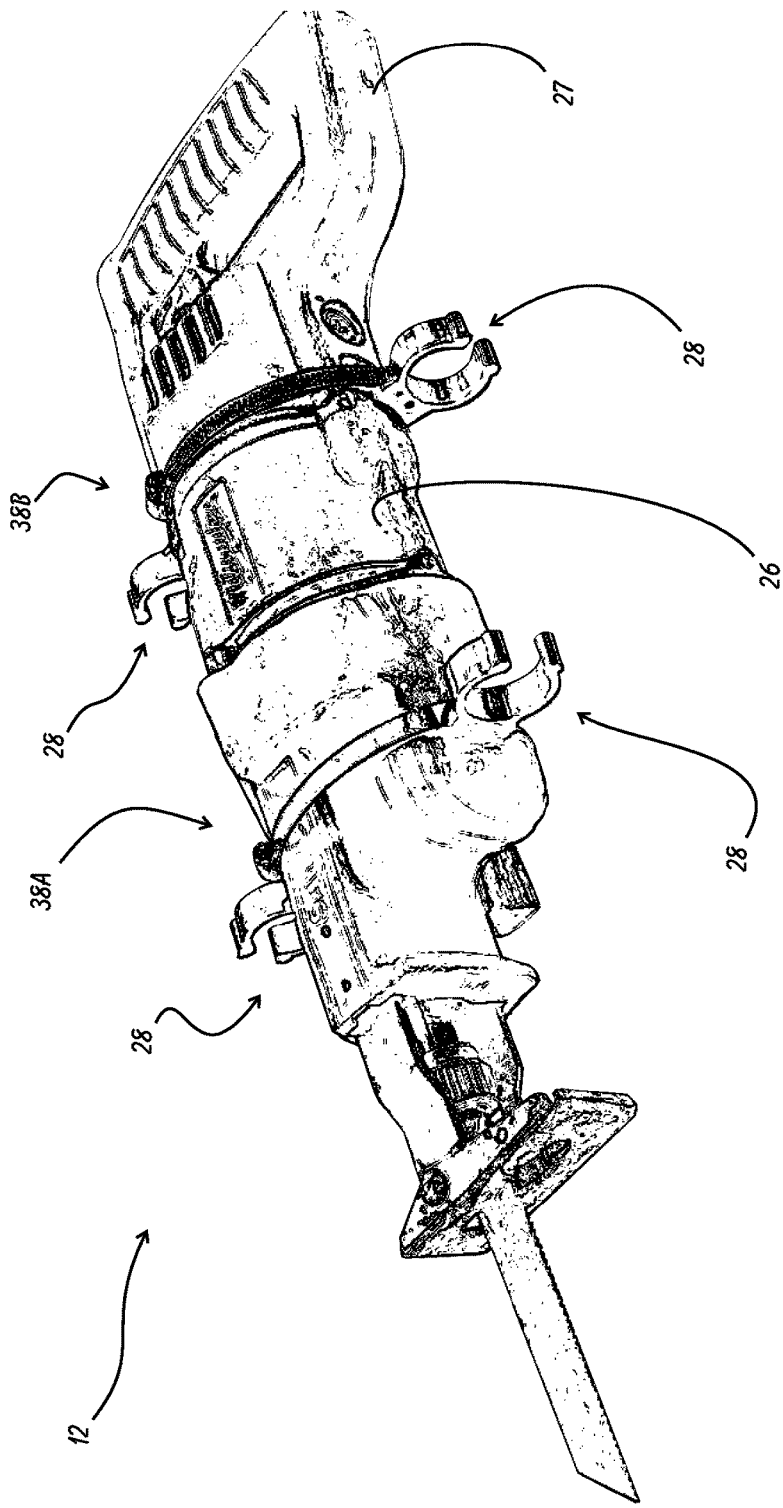
FIG. 5 is a perspective view of reciprocating saw having the clip assemblies of FIGS. 1-4 attached thereto.

FIG. 5 is a perspective view of reciprocating saw 12 having the clip assemblies 38A, 38B of FIGS. 1-4 attached thereto. As shown, the lower clip assembly 38A is attached to the body 26 near the tapered (blade) end of the saw 12. The upper clip assembly 38B is attached to the body 26 near to the handle 27 of the saw 12. In this way, the suction hoses [14A, 14B] will be held snugly to the sides of the body 26 in the hose clips 28.

It should be noted that the typical saw 12 has a body 26 of between 3½ inches to 5 inches in diameter. The diameter of the straps 24 can be adjusted to accommodate any of the commercially-available saws 12 on the market (unlike any design in the prior art).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A dust collection assembly for attachment to a reciprocating saw, the saw defined by a body defining an elongate axis, said saw terminating in a blade end and having a power-reciprocating blade operable in a reciprocating fashion extending therefrom generally along said body elongate axis and a handle end opposing said blade end, the assembly comprising:
    a first suction hose extending along a first side of said body between said handle end and said blade end;
    a second suction hose extending along a second side of said body between said handle end and said blade end, said suction hoses terminating in intake ports at said blade end and in exit ports at said handle end, said intake ports defined by open hose ends unattached to an enclosed or semi-enclosed housing for said saw blade;
    said suction hoses comprise a memory portion terminating in said intake ports, said memory portions configured to retain a bent configuration once placed in said bent configuration;
    an adapter manifold defined by a pair of intake nozzles at a first end and an exit nozzle at an opposing second end, one said intake nozzle attached to each said exit port; and
    means for attaching said suction hoses to said saw body, wherein said means for attaching said suction hoses to said body comprises one or more clip assemblies attached to said saw body, each said clip assembly comprising a body strap configured to encircle the saw body, and a pair of hose clips attached to said body strap, wherein one said suction hose is retained within said hose clip.

2. The dust collection assembly of claim 1, wherein said suction hoses further comprise a non-memory portion, said non-memory portion configured to be flexible and not to retain a bent configuration.

3. The dust collection assembly of claim 2, wherein each said suction hose defines an intake port at a blade end and an exit port at a handle end, and with said memory portion extending from said blade end and said non-memory portion extending from said handle end.

4. The dust collection assembly of claim 3, wherein
    at least one said hose clip is slidingly attached to a said body strap.

5. The dust collection assembly of claim 4, wherein said attachment means comprises a first said clip assembly attached to said saw body adjacent to said blade end and a second said clip assembly attached to said saw body adjacent to said handle end, and in spaced relation to said first clip assembly, with one said suction hose attached to one said hose clip of each said clip assembly and said other said suction hose attached to the other of said hose clips of each said clip assembly.

6. The dust collection assembly of claim 5, wherein said suction hoses comprise a flexible tubular hose element, and said memory portions of said suction hoses are defined by one or more bendable metal rods attached to said flexible tubular hose.

7. The dust collection assembly of claim 6, wherein said bendable metal rods are attached to said flexible tubular hoses by a second outer tubing encircling said flexible tubular hose and said one or more bendable metal rods.

8. A dust collection combination, comprising:
- a reciprocating saw defined by a body defining an elongate axis, said saw terminating in a blade end and having a power-reciprocating blade operable in a reciprocating fashion extending therefrom generally along said elongate body axis and a handle end opposing said blade end;
- a dust collection assembly, comprising:
  - a first suction hose extending along a first side of said body between said handle end and said blade end and terminating in an open end unattached to an enclosed or semi-enclosed housing for said saw blade;
  - a second suction hose extending along a second side of said body between said handle end and said blade end, said suction hoses in exit ports at said handle end;
  - an adapter manifold defined by a pair of intake nozzles at a first end and an exit nozzle at an opposing second end, one said intake nozzle attached to each said exit port; and
- means for attaching said suction hoses to said saw body generally along said body axis, said attaching means comprises one or more clip assemblies attached to said saw body, each said clip assembly comprising a body strap configured to substantially encircle the saw body, and a pair of hose clips attached to said body strap, wherein one said suction hose is retained within said hose clip.

9. The dust collection assembly of claim 8, wherein at least one or more of said hose clips is slidingly attached to said body strap.

* * * * *